United States Patent
Strogov et al.

(10) Patent No.: US 12,464,020 B2
(45) Date of Patent: Nov. 4, 2025

(54) AI-GENERATED VIRTUAL FILE HONEYPOTS FOR COMPUTING SYSTEMS BEHAVIOR-BASED PROTECTION AGAINST RANSOMWARE ATTACKS

(71) Applicant: Acronis International GmbH, Schaffhausen (CH)

(72) Inventors: Vladimir Strogov, Singapore (SG); Alexey Kostyushko, Yerevan (AM); Aliaksei Dodz, Singapore (SG); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 72 days.

(21) Appl. No.: 18/620,399

(22) Filed: Mar. 28, 2024

(65) Prior Publication Data
US 2025/0310376 A1 Oct. 2, 2025

(51) Int. Cl.
*H04L 9/40* (2022.01)
(52) U.S. Cl.
CPC ...... *H04L 63/1491* (2013.01); *H04L 63/1416* (2013.01); *H04L 63/1466* (2013.01)
(58) Field of Classification Search
CPC ............. H04L 63/1491; H04L 63/1416; H04L 63/1466
See application file for complete search history.

(56) References Cited

U.S. PATENT DOCUMENTS

| | | | |
|---|---|---|---|
| 10,193,918 B1 * | 1/2019 | Patton ................... | G06F 21/566 |
| 10,607,009 B2 * | 3/2020 | Dahan ................... | G06F 21/568 |
| 10,713,361 B2 | 7/2020 | Strogov et al. | |
| 10,938,854 B2 * | 3/2021 | Strogov .............. | H04L 63/1416 |
| 11,010,469 B2 * | 5/2021 | Aharoni ................ | G06F 21/554 |
| 11,416,612 B2 | 8/2022 | Strogov et al. | |
| 11,546,373 B2 * | 1/2023 | Jevans ................ | H04L 63/1425 |
| 11,586,736 B2 | 2/2023 | Strogov et al. | |
| 11,609,988 B2 | 3/2023 | Strogov et al. | |
| 11,609,992 B2 | 3/2023 | Gryaznov et al. | |
| 11,611,586 B2 | 3/2023 | Strogov et al. | |
| 12,169,563 B2 * | 12/2024 | Gechman ............... | G06N 3/045 |
| 12,259,976 B1 * | 3/2025 | Mercado-Alcala ... | G06F 21/566 |
| 2018/0248896 A1 * | 8/2018 | Challita ................ | G06F 21/554 |
| 2023/0205877 A1 | 6/2023 | Ulasen et al. | |
| 2023/0205880 A1 | 6/2023 | Ulasen et al. | |

(Continued)

FOREIGN PATENT DOCUMENTS

CN    114499915 A    5/2022

OTHER PUBLICATIONS

Acronis. The Ultimate MSP Guide to Ransomware Protection and Recovery, Nov. 13, 2023, https://www.acronis.com/en-eu/blog/posts/msp-ransomware-protection-recovery-guide/, The Ultimate MSP Guide to Ransomware Protection and Recovery.pdf.

*Primary Examiner* — Viral S Lakhia
(74) *Attorney, Agent, or Firm* — ESPE Legal Consultancy FZ-LLC

(57) ABSTRACT

Systems and methods for protecting computing systems against ransomware attacks using AI-generated virtual file honeypots. Generative AI comprising a large language model generates virtual file honeypots automatically in response to attack vectors associated with suspect actors and ransomware families.

20 Claims, 6 Drawing Sheets

(56) References Cited

U.S. PATENT DOCUMENTS

| | | | |
|---|---|---|---|
| 2023/0231881 A1* | 7/2023 | Radhakrishnan | H04L 63/1425 726/23 |
| 2024/0333759 A1* | 10/2024 | Zhang | H04L 63/1416 |
| 2025/0077669 A1* | 3/2025 | Haak | G06F 21/565 |

* cited by examiner

AI-GENERATED VIRTUAL FILE HONEYPOTS FOR COMPUTING SYSTEMS BEHAVIOR-BASED PROTECTION AGAINST RANSOMWARE ATTACKS

TECHNICAL FIELD

The current invention relates to the field of computer security. More particularly, the invention relates to the generation of virtual file honeypots using generative artificial intelligence (AI) devices, particularly for detection and remediation of malware.

BACKGROUND

Modern computing systems face a critical challenge in safeguarding their valuable data and operations against the ever-evolving threat of malware and ransomware attacks. Ransomware, for example, is typically malicious software that encrypts or blocks access to a system's files until a ransom is paid. Ransomware attacks have become a significant menace to computing systems, causing financial losses, operational disruptions, and potential data breaches.

Classic ransomware encrypts the victim's data and demands a ransom for the decryption key. Ransomware can employ various attack vectors, such as phishing emails, malicious attachments, drive-by downloads, exploit kits, removable media, or network propagation. Ransomware can also use various evasion techniques, such as code obfuscation, encryption, packing, polymorphism, or metamorphism, to avoid detection by signature-based antivirus systems. Moreover, some ransomware variants use advanced techniques, such as fileless execution, encryption of network traffic, and anti-analysis mechanisms, to avoid being analyzed by security researchers and automated tools.

One of the ways by which malicious processes and ransomware are detected is with file honeypots. Honeypots are decoy files injected into filesystem directories to attract and identify suspicious processes. File honeypots can be inserted on a storage device along with real files to bait suspicious processes to reveal themselves as malware.

Some advanced ransomware variants may analyze the content of files to determine their value. For example, ransomware targeting businesses or specific industries might look for files containing financial information, proprietary data, or customer information. Encrypting these files first or ensuring they are encrypted can increase the pressure on the victim to pay the ransom. In addition to encrypting files, some ransomware attacks involve data exfiltration, where the attackers steal data before or during the encryption process. In these cases, the ransomware or an associated component might analyze file contents to select valuable data for exfiltration.

In targeted ransomware campaigns, such as those directed at specific organizations, attackers might customize the ransomware to search for and encrypt files of particular importance to the target. This could involve some level of content analysis to identify high-value files based on keywords, data patterns, or other indicators.

Historically, generating file honeypots has been manual, time-consuming, and not always representative of real-world conditions. Current solutions rely heavily on real customer data or manual simulations using available cybercrime attack tools. However, these methods are limited by lack of representation for edge cases, and rapid obsolescence. Traditional methods also typically have inefficiencies, gaps in coverage, and potential security vulnerabilities.

Thus, there is a need in the art for an improved system and methods that overcome these disadvantages.

SUMMARY

Systems and methods are disclosed for protecting computing systems (CS) against ransomware attacks using AI-generated virtual file honeypots (VFHs). Generative AI comprising a large language model (LLM) generates VFHs automatically in response to attack vectors associated with suspect actors.

An exemplary method automatically generates VFHs that protect a computing system from ransomware attacks using an artificial intelligence device (AI device). The method comprises pretraining a generative machine-learning device, monitoring and detecting ransomware activity, and updating and testing the device and the VFHs.

VFHs attract and deceive ransomware, while also allowing for detection and identification of the malicious actor. VFHs are used to lure ransomware into encrypting decoy files of the VHF instead of real files, and to collect information about the ransomware behavior and characteristics. Realistic and convincing VFHs are created with features tailored for different ransomware families and their activities. The AI device generates VFHs automatically and dynamically based on the ransomware's context.

In an exemplary embodiment, the AI device is a generative machine-learning device that comprises a large language model (LLM) that can create natural language text. The device uses natural language processing (NLP) to extract features from a training dataset collected from various threat-intelligence sources of ransomware data.

The AI device then categorizes the dataset based on ransomware families and generates VFHs according to the properties of each family. For example, the device creates VFHs that mimic the file names, extensions, sizes, contents, and metadata of the files that are typically targeted by a ransomware family. The device can also create VFHs that contain keywords, phrases, or patterns that are relevant to a ransomware activity, such as a ransom note, a decryption tool, or a payment instruction.

The method also includes monitoring the operation of the target computing system and detecting any suspicious activity that may indicate a ransomware attack. A behavior engine identifies a suspect actor associated with the activity and collects information and characteristics of the actor, such as a certificate, a hash of a file, or a binary file. The behavior engine predicts the ransomware family that the actor belongs to and the AI device configures the VFH file format, file size, file content, file structure, or other aspects of the file accordingly to mimic the real file. To be effective against ongoing threats, VFHs are configured quickly and automatically.

The method provides the suspect actor with the generated VFHs and performs a heuristic analysis to confirm the malware detection. The heuristic analysis compares the encryption patterns, I/O patterns and sequences and ransom demands of the actor with known ransomware features and the VFH properties. The method also records the encryption keys and the decryption methods used by the actor for possible recovery purposes.

The method further includes updating the training dataset and the generative machine-learning device with new and relevant ransomware data from various sources, including the target computing system itself. The method also tests the device and the VFHs against known ransomware cases in isolated environments and generates feedback loops for retraining and improvement. The method initiates security actions based on the detected malware. Security actions comprise alerting the user, suspending or terminating the malicious process, or performing system recovery.

In an exemplary embodiment, virtual file honeypots (VFHs) are generated automatically for protecting a target computing system (CS) against ransomware attacks using an artificial intelligence (AI) device. A generative machine-learning device comprising a large language model (LLM) is pretrained to generate VFHs for specific ransomware families and characteristic activities. The pretraining comprises collecting a pretraining training dataset from threat-intelligence sources of ransomware data and the ransomware data comprises data specific to a ransomware family. Features are extracted from the training dataset using natural language processing (NLP) and the pretraining dataset is categorized based on ransomware families. An operation of the CS is monitored and a determination is made whether the operation comprises suspicious activity according to a policy. A suspect actor associated with the suspicious activity is identified and behavior information and characteristics of the suspect actor are collected. A predicted ransomware family is identified based on the operation comprising suspicious activity. Properties of VFHs are configured based on the predicted ransomware family and the collected behavior information and characteristics of the suspect actor and a plurality of VFHs are generated according to the configured VFH properties using the generative machine-learning device. The method of claim 1, wherein identifying a predicted ransomware family is further based on the identified suspect actor.

In alternative embodiments, the pretraining dataset comprises leaked data associated with known ransomware attacks. The pretraining dataset can also comprise historical ransomware data of the CS. The characteristics of the suspect actor can include a certificate, a hash of a file, a binary file, or a reputation. A process can be identified (or an injected thread in a trusted process) created by the suspect actor on the CS. A process can be provided, or the injected thread in a trusted process, with the plurality of generated VFHs. A suspect actor can be detected as a source of malware by performing a heuristic analysis.

Further embodiments, comprise implementing a partial update of the pretraining dataset by updating ransomware data with data collected from threat-intelligence sources, data collected by web crawlers, and data from the target CS. Pretraining the LLM to generate VFHs can also comprise performing testing scenarios, including generating a test VFH using the generative machine-learning device for a test case, corresponding to a known ransomware and a corresponding known ransomware family, test behavior information, and test characteristics of a test suspect actor. The known ransomware can be executed in an isolated environment and a process of the known ransomware provided with the test VFHs. Known ransomware can be detected by performing a heuristic analysis. A feedback loop about the VFHs can be generated for retraining the generative machine-learning device and the generative machine-learning device retrained based on the known ransomware family, the test behavior information, the test characteristics of the test suspect actor, and the feedback loop.

The predicted ransomware family for the suspect actor identification can be dynamically updated based on an analysis of current CS operations and the behavior of the potentially malicious actor. A feedback loop can be generated for a generated VFH, wherein the feedback loop comprises confirmed malware detections, a predicted ransomware family, behavior information, and characteristics of the potentially malicious actor for retraining of the generative machine-learning module. Identifying the predicted ransomware family can comprises matching suspect actor operations using the generative machine learning device applied to operations of the known ransomware families, analyzing static features of program code associated with the suspect actor operations, or analyzing Windows Portable Executables (PE) using a PE-machine learning model trained based on known ransomware to determine a ransomware family.

The generated VFHs can be validated against predefined criteria associated with a specific ransomware family, wherein the predefined criteria include file format, file size, file content, or file structure. A security action can be initiated based on a detected malware, wherein the security action generates an alert to a user of the CS and provides the user of the CS with detection results. The detection results can comprise an indication of the potentially malicious actor as malware injection, suspending the injected thread created by the malware injection, terminating the injected thread created by the malware injection, or performing CS recovery based on an existing snapshot, wherein the CS recovery does not include any of the plurality of generated VFHs.

A system is disclosed for automatic generation of virtual file honeypots (VFHs) for protecting a target computing system (CS) comprising user space and kernel space against ransomware attacks using an artificial intelligence (AI) device. The system comprises a pretrained generative AI device coupled to a processor and a storage medium comprising a large language model (LLM) to generate VFHs for specific ransomware families and characteristic activities, wherein the pretrained generative AI device is pretrained by collecting a pretraining training dataset from threat-intelligence sources of ransomware data, wherein ransomware data comprises data specific to a ransomware family. Features from the training dataset are extracted using natural language processing (NLP) and the pretraining dataset is categorized based on ransomware families. A virtual honeypot driver, operating in kernel space and in communication with the AI device, is configured for monitoring an operation of the CS and determining whether the operation comprises suspicious activity according to a policy. The virtual honeypot driver is further configured for identifying a suspect actor associated with the suspicious activity, collecting behavior information and characteristics of the suspect actor, and identifying a predicted ransomware family based on the operation comprising suspicious activity. VFH properties are configured by the AI device based on the predicted ransomware family and the collected behavior information and characteristics of the suspect actor. The AI device generates a plurality of VFHs according to the configured VFH properties using the generative machine-learning device. The system includes a filesystem comprising a plurality of files in user space. The generated VFHs, configured to mimic targets of the predicted ransomware family, are created (or served) by the virtual honeypot driver.

In alternative embodiments of the system, as with the method described above, identifying a predicted ransomware family can be based on the identified suspect actor. The pretraining dataset can also comprise leaked data associated with known ransomware attacks. The pretraining dataset can further comprise historical ransomware data of the CS wherein the characteristics include a certificate, a hash of a file, a binary file, or a reputation.

Also disclosed is a non-transitory computer-readable storage medium with instructions for automatic generation of virtual file honeypots (VFHs) for protecting a target computing system (CS) against ransomware attacks using an artificial intelligence (AI) device. The instructions include pretraining a generative machine-learning device comprising a large language model (LLM) to generate VFHs for specific ransomware families and characteristic activities. The pretraining comprises collecting a training dataset from threat-intelligence sources of ransomware data, wherein ransomware data comprises data specific to a ransomware family, extracting features from the training dataset using natural language processing (NLP), and categorizing the pretraining dataset based on ransomware families. An operation of the CS is monitored and a determination is made whether the operation comprises suspicious activity according to a policy. A suspect actor associated with the suspicious activity is identified and behavior information and characteristics of the suspect actor are collected. A predicted ransomware family is identified based on the operation comprising suspicious activity. VFH properties are configured based on the predicted ransomware family and the collected behavior information and characteristics of the suspect actor. A plurality of VFHs are generated according to the configured VFH properties using the generative machine-learning device. In an alternative embodiment, identifying the predicted ransomware family is further based on the identified suspect actor.

BRIEF DESCRIPTION OF THE DRAWINGS

The invention may be more completely understood in consideration of the following detailed description of various embodiments in connection with the accompanying figures.

DETAILED DESCRIPTION

Figure 1:
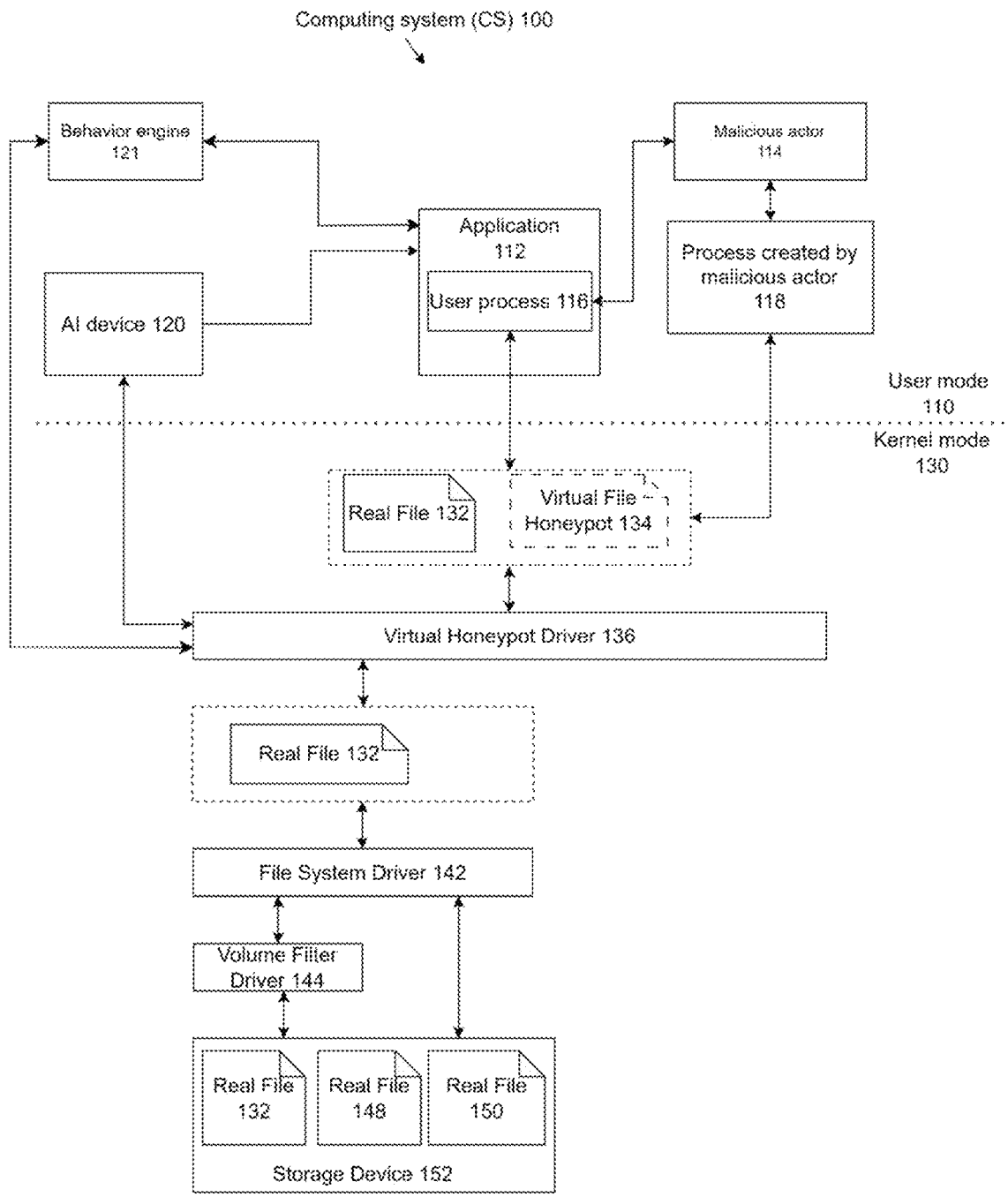
FIG. 1 is a block diagram of a computing system for ransomware protection according to an embodiment.

The embodiments described below provide enhanced protection for computing systems with minimal impact on system resources and operations. Ransomware is detected quickly and, by generating a plurality of VFHs targeted at a suspicious process or thread, a suspicious actor or thread can be detected before or much earlier than alternative security solutions to stop the suspicious actor or thread from getting access to real files. Generative AI models, including large language models (LLMs), are used to dynamically generate virtual file honeypots (VFHs) based on aspects of a suspected bad actor. These aspects include actor behavior information and distinguishing characteristics actor. Examples of characteristics include certificates, file hashes, binary files, reputations, or known ransomware family affiliations. By employing a generative AI model pretrained with a comprehensive dataset encompassing various ransomware attack patterns, typical system operations, and target data contents, the system creates VFHs tailored to the specific threat landscape identified at any given moment. This approach allows the system to adapt to new and evolving ransomware tactics dynamically. For example, VFHs can be configured to imitate the file type and content targeted by specific ransomware families.

A feedback loop is incorporated, whereby data about confirmed malware detections and the effectiveness of deployed VFHs are used to continuously retrain the generative AI model. This improves the model's accuracy and effectiveness over time and ensures that the system remains up to date with the latest ransomware threats.

Storage consumption is reduced for VFHs compared to the file snapshots typically used for file honeypots. For example, storage is not used, and file structures are not created for a VFH. Backup operations do not "see" such VFHs, so VFHs are not included in backup storage. VFHs thereby protect a computing system from malware without adding to system overhead. Thus, the use of VFHs does not burden system resources.

In an exemplary embodiment, a system for AI-generated VFHs is deployed to protect a computing system from ransomware attacks. The computing system generally comprises a storage device with a plurality of files that are accessed for reading and writing by a variety of processes in user space.

A virtual honeypot driver operates in kernel space to manage virtual file honeypot (VFH) creation. The virtual honeypot driver operates as an intermediary between processes attempting to access files on the storage device and the storage device itself, thereby safeguarding the computing system (CS) from ransomware attacks. The virtual honeypot driver monitors operations within the CS to detect suspicious activities based on predefined policies. Upon identifying operations that are potentially malicious, the virtual honeypot driver determines the associated ransomware family for the identification of the potentially malicious actor. This process involves collecting behavior information and characteristics of the potentially malicious actor, which can include elements such as certificates, file hashes, binary files, reputations, or known ransomware family affiliations. The AI device uses collected data points, behavior information, and characteristics of the potentially malicious actor to configure and generate virtual file honeypots (VFHs).

VFHs are configured and generated by the AI device in cooperation with the virtual honeypot driver to protect the CS without adding to system overhead. The VFHs are tailored to the operating environment of the CS and the specific tactics of the ransomware. The virtual honeypot driver works with a generative AI device, comprising a large language model (LLM) pre-trained on a dataset that includes ransomware family attack patterns, typical system operations targeted by ransomware, and specific data that the ransomware family seeks to encrypt or exfiltrate. The generation of virtual file honeypots (VFHs) begins with the collection of detailed behavior information and characteristics of potentially malicious actors, such as certificates, hashes of files, binary files, reputations, or known ransomware family affiliations. This data is used for training the AI model to detect specific ransomware family behavior and generate realistic VFHs for that family. Upon detection of suspicious activity that matches the profile of a potentially malicious actor, the virtual honeypot driver instructs the generative AI model to create VFHs on-demand.

VFHs are used as decoys to attract ransomware, thereby preventing the ransomware from accessing real files and allowing for the early detection and analysis of the ransomware's behavior. Dynamic generation of VFHs ensures specificity in the ability of the honeypot to mimic potential ransomware targets and allows for rapid adaptation to ongoing attacks. As the AI model continues to learn from each ransomware interaction, it becomes increasingly effective at predicting and counteracting ransomware activities. This learning process is further enhanced by a feedback loop, where information about the success of VFHs in attracting and detecting ransomware, along with confirmed malware detections, is fed back into the system to refine and improve the generative AI model's accuracy and effectiveness. Moreover, the application of VFHs extends beyond detection. By analyzing the interactions of ransomware with VFHs, the system learns ransomware behavior, attack patterns, and encryption techniques. This information is used for developing ransomware countermeasures, improving system resilience, and developing decryption tools to recover encrypted data without acquiescing to ransom demands.

Heuristic analysis refers to examining file-related behavior and characteristics indicative of malicious activity. In the context of ransomware, heuristic analysis detects ransomware attacks by identifying patterns and behaviors that deviate from normal or expected file operations. Certain kinds of heuristic analysis are typically performed when analyzing ransomware attacks for indicia of malicious intent. One example is rapid mass encryption, where many files are rapidly encrypted within a short time. Such behavior is indicative of ransomware trying to encrypt as many files as possible as fast as possible before detection. Entropy of monitored data can also be used to determine that encryption of the data is occurring. If the entropy of the data grows faster than a predetermined threshold rate, the entropy growth rate can be identified as a sign of ongoing encryption. Another example is the use of unusual file extensions. Ransomware often appends new and unusual file extensions to encrypted files. Heuristic analysis monitors for sudden and widespread changes in file extensions across the system. Inconsistent file modification is another sign of malware. Ransomware may modify files across different directories or drives in an inconsistent manner. Heuristic analysis identifies unusual modification patterns that suggest malicious file encryption. Simultaneous file access is another sign of malware. When multiple files are accessed simultaneously by a process or thread that typically doesn't exhibit such behavior, heuristic analysis can flag such file access as suspicious. Changes in file creation or modification timestamps also suggest ransomware attacks, which can result in the modification of file timestamps, particularly creation and modification times. Heuristic analysis detects abrupt and widespread changes in these timestamps. Another sign of malware is unusual file activity during off-hours. Ransomware attacks are often timed to occur during off-peak hours to avoid immediate detection. Heuristic analysis can give increased scrutiny to file activities that occur at unusual times. A high volume of file writes is also a sign of malware. Ransomware encrypts files by writing encrypted data. Thus, heuristic analysis looks for an unusually high volume of file write operations.

In an embodiment, heuristics used in classification include patterns of full file read, combined delete and create operations, renaming special file extensions, or MIME type changes as the result of file write operations. These operations, when encountered, contribute to the classification of a session as potentially malicious or unsafe. In an embodiment, full read, delete, and create as a classification heuristic accounts for matching create operations for the full read and delete operation pairs to reduce false positives.

Heuristics require access to file content after modification. The virtual honeypot driver doesn't store file content information after modification. When ransomware interacts with VFHs, any modification, encryption, or other tampering can be detected without the need for a baseline comparison. Thus, there is no need to preserve content before the modification because the virtual honeypot driver knows how the content was initially generated. The virtual honeypot driver presents virtual file honeypots to lure potential malicious processes or injected threads acting as ransomware in benign processes. The inserted virtual file honeypots are used for heuristics and are not snapshotted or backed up.

Although a traditional file honeypot may be considered a "virtual" file in the sense that it mimics a real system file, the term "virtual" in the context of a virtual file honeypot refers to technical characteristics of the file honeypot. For example, a virtual file honeypot differs from traditional honeypots because it lacks backup storage or any physical presence of its own within the real file system to be protected. Further, a virtual file honeypot is also virtual in the sense that it is generated on-demand in response to a process and can have variable characteristics depending on the specific system or context. Thus, a virtual file honeypot is ephemeral in that it is created on-demand and does not persist in system storage.

Some embodiments solve the problem of a malicious actor, which could be a process, injecting threads into benign processes, so that the injected threads act as ransomware under the cover of the benign process. These embodiments are configured to analyze events from a driver to identify a potentially malicious actor. A confidence level can be calculated for the malicious actor identification to weigh the probability that the actor is malware or is a source of malware. Behavior associated with the potentially malicious actor can be collected if there is a likelihood that this potentially malicious actor is involved with malware activities, for example, indicated by a confidence level that exceeds a predetermined threshold. Then, the suspicious process of the identified potentially malicious actor or the process or chain of processes or threads created by the potentially malicious actor process are identified. One or more virtual honeypots can then be generated for the suspicious process or threads and included in anti-ransomware heuristic analysis.

Virtual file honeypots (VFHs) are generated automatically to protect a computing system from ransomware attacks using an artificial intelligence (AI) device. In an embodiment, the method comprises pretraining a generative machine-learning device, monitoring and detecting ransomware activity, and updating and testing the AI device and the VFHs.

The method uses the AI device to generate VFHs both automatically and dynamically based on the ransomware context. The AI device employs generative machine-learning and comprises a large language model (LLM) to process natural language text. The AI device uses natural language processing (NLP) to extract features from a training dataset collected from various threat-intelligence sources of ransomware data.

The AI device then categorizes the dataset based on ransomware families and generates VFHs according to the properties of each family. For example, the AI device can create VFHs that mimic the file names, extensions, sizes, contents, and metadata of the files that are typically targeted by a ransomware family. In an embodiment, the AI device creates VFHs that contain keywords, phrases, or patterns that are relevant to a ransomware activity, such as, a decryption tool, or a payment instruction.

The method also involves monitoring the operation of the target computing system and detecting any suspicious activity that may indicate a ransomware attack. A behavior engine identifies a suspect actor associated with the activity and collects information and characteristics of the actor, such as a certificate, a hash of a file, or a binary file. The behavior engine then predicts the ransomware family that the actor belongs to and the AI device configures VFHs accordingly.

The method serves the suspect actor with the generated VFHs and performs a heuristic analysis to confirm malware detection. The heuristic analysis compares the encryption patterns, and the ransom demands of the actor with known ransomware family features and the VFH properties. The method can also record the encryption keys and the decryption methods used by the actor for recovery purposes.

The method further comprises updating the training dataset and the generative machine-learning device with new and relevant ransomware data from various sources. In some embodiments, this data is collected from the target computing system itself. In an embodiment, the device and the VFHs are tested against known ransomware cases in isolated environments and feedback loops are generated for retraining and improvement. In an embodiment, the method initiates security actions based on the detected malware, such as alerting the user, suspending or terminating the malicious process, or performing system recovery.

The method creates realistic and adaptive VFHs that deceive and expose ransomware. The method also allows for the continuous learning and improvement of the device and the VFHs based on the latest ransomware trends and data. VFHs are realistic and adaptive, meaning that they can deceive and expose different ransomware variants and actors, as well as evade their detection and anti-analysis mechanisms.

The VFHs are generated and deployed automatically, meaning that they do not require manual intervention or maintenance, and they address dynamic and evolving ransomware threats. VFHs are harmless and disposable, meaning that they do not contain any sensitive or valuable information, and they can be easily removed or replaced after the attack.

In an embodiment, the method is implemented using an AI device with a VFH trainer and a VFH generator. The VFH trainer is a component that pretrains the AI device using a training dataset collected from various threat-intelligence sources of ransomware data. The VFH generator is a component that dynamically generates and deploys VFHs on the target computing system, based on the real-time monitoring and analysis of the system operation and the behavior of the potentially malicious actors.

In an embodiment, the AI device comprises a VFH trainer module and an LLM. The LLM is pre-trained on a corpus of ransomware-related contents to capture the linguistic patterns and features of files attacked by different ransomware families. These contents comprise, for example, target domain content samples, patterns tokens, text, code, charts, dialects, and languages. The LLM also generates contents that match the behavior and characteristics of a suspect actor, such as the file name, extension, size, content, and encryption method, by conditioning on the contextual information collected from the target CS.

In an embodiment, the VFH generator is a module of the AI device that is responsible for creating the VFHs according to configured properties. The VFH generator takes as input the predicted ransomware family, the collected behavior information and the characteristics of the suspect actor. The VFH generator then uses the LLM to produce a set of VFHs that match the linguistic features and content of files targeted by the ransomware family and the suspect actor. The VFH generator also ensures that the generated VFHs have the same or similar file name, extension, size, and encryption method as the original files on the CS.

Once generated by the AI device, the VFHs are monitored by the virtual honeypot driver and the behavior engine. If malware is detected, the virtual honeypot driver can initiate security actions. In this way, the virtual honeypot driver together with the behavior engine performs heuristic analysis and detects and responds to ransomware attacks that target the VFHs generated by the AI device.

The AI device and its modules are implemented using machine learning tools, such as Python and PyTorch frameworks. A transformers library can be used, which provides a high-level API for working with various transformer-based models, such as GPT-4. The library also provides pre-trained models and datasets that can be used for fine-tuning or transfer learning. For example, a pre-trained GPT-4 model can be loaded and fine-tuned on a custom corpus of ransomware-related texts.

The PyTorch Lightning framework can be used to simplify the training process and allow for distributed and multi-GPU training. PyTorch Lightning also provides callbacks and metrics that can be used to monitor and evaluate the model performance. For example, a PyTorch Lightning module can be defined for the LLM and trained on multiple graphics processing units (GPUs).

In an embodiment, an LLM similar to GPT-4 provides the LLM for generating the VFHs. GPT-4 is a state-of-the-art transformer-based language model with around a trillion or more parameters. The LLM is trained on a corpus of ransomware-related contents from targeted files, collected from various threat-intelligence sources that collect ransomware data. Leaked data from known ransomware attacks and historical ransomware data from the target CS can also be included in the corpus. Leaked data refers to information that has inadvertently or maliciously been made public, including details of previously successful ransomware attacks, specific content of the targeted files. Historical ransomware data consists of documented instances of ransomware attacks that have targeted the computing system itself or other systems. This data includes specific ransomware targeted content and files and how different ransomware families operate and evolve. By analyzing leaked data and historical ransomware data, the generative AI can understand trends and patterns in ransomware development and deployment, which aids in predicting and preparing for future attacks. For example, data from WikiLeaks and data collected by web crawlers can be used. The corpus is preprocessed using NLP techniques, such as tokenization, lemmatization, and named entity recognition, to extract the relevant features and categorize the contents based on the ransomware families.

The AI device and method uses NLP techniques to extract features and categorize the training dataset based on ransomware families, which allows for the fine-tuning of the LLM for generating VFHs for specific ransomware families and characteristic activities. The AI device and method also implements a feedback loop and an incremental update mechanism to improve the quality and diversity of the VFHs and adapt to the evolving ransomware landscape. An exemplary incremental update mechanism comprises receiving periodic updates to training datasets based on new threat intelligence and historical data information. These updates are then used to fine tune the LLM. The proposed AI device and method can detect ransomware attacks by performing heuristic analysis on the processes or injected threads created by the suspect actors on the CS, and initiate security actions based on the detection results.

Natural language processing (NLP) techniques are methods that allow computers to analyze, understand, and generate natural language texts. Some NLP techniques that are used for feature extraction include term frequency-inverse document frequency (TF-IDF). This technique computes a weight for each word in a document based on its term frequency (TF), which is the number of times the word appears in the document, and its inverse document frequency (IDF), which is the logarithm of the ratio of the total number of documents in the corpus and the number of documents that contain the word. The weight reflects the importance of the word in the document and the corpus. TF-IDF can capture the specificity and relevance of the words and reduce the impact of common words that appear in many documents.

Another NLP technique is word embedding. This technique maps each word to a vector of fixed length that represents its semantic and syntactic features. The vector is learned from the context of the word in a large corpus, such as Wikipedia or Common Crawl, using neural network models, such as word2vec, GloVe, or fastText. Word embeddings can capture the meaning and similarity of the words and account for synonyms, antonyms, and polysemy.

Another NLP technique comprises sentence embeddings. This technique maps each sentence to a vector of fixed length that represents its overall meaning and structure. The vector is learned from the sequence and composition of the words in the sentence, using methods such as recurrent neural networks (RNNs), convolutional neural networks (CNNs), or transformers, such as BERT or GPT-4. Sentence embeddings can capture the coherence and logic of the sentences and account for paraphrasing, entailment, and contradiction.

VFH generation is implemented by the AI device based on predicted ransomware family and the behavior information and characteristics of the suspect actor. VFHs can then be deployed in an unsupervised manner, without relying on predefined rules or signatures, which makes them more scalable and adaptable to new or unknown ransomware variants. The AI device can generate VFHs that are dynamic and diverse, which makes them more resilient and robust against ransomware evasion techniques, such as encryption, obfuscation, or polymorphism.

Referring to FIG. 1, a block diagram of an exemplary computing system (CS) 100 configured for ransomware protection is depicted, according to an embodiment. Computing system 100 generally comprises one or more processors and nonvolatile storage media in a networked configuration so that computing resources are available to system users. System 100 includes user mode 110 where applications and processes originate. In FIG. 1, for example, application 112 comprising user process (or threads) 116 runs in user mode 110 along with other user processes and operating (OS) system processes.

Application 112 comprises process 116 configured to execute on CS 100. In an embodiment, process 116 is a known trusted process. For example, trusted process 116 can be identified as safe or trusted according to a valid digital signature associated with application 112 or process 116.

Malicious actor 114 comprises a process or thread. In an embodiment, the malicious actor can be an object, device, application or user. In an embodiment, malicious actor 114 is capable of injecting one or more threads into application 112. In an embodiment, malicious actor 114 can be a process executing on CS 100 and can create one or more additional processes on CS 100. In another example, malicious actor 114 can be a device communicatively coupled to CS 100, such as over a network.

User process 116 comprises a thread injected into application 112 by malicious actor 114. In an embodiment, a malicious thread operates as part of application 112. Accordingly, the intent of malicious actor 114 is to disguise the malicious activities of the thread injected into user process 116 of application 112.

Process 118 is a process created by malicious actor 114. In an embodiment, process 118 operates in user mode 110 of CS 100. In this context, malicious actor 114 can be a process that injects a thread into application 112 as previously described. In an embodiment, malicious actor 114 uses an existing process 116, and creates process 118 or creates a chain of processes including process 118 and other processes not shown.

Behavior engine 121 is configured to identify suspicious operations of one or more processes of CS 100. For example, behavior engine 121 is configured to receive events from virtual honeypot driver 136, analyze the received events, and determine whether one or more operations associated with an event are suspected as malware. In an embodiment, behavior engine 121 uses the output of detected events by virtual honeypot driver 136 for monitoring processes.

In an embodiment, determining whether one or more operations associated with an event are suspicious as malware is conducted according to a policy. Behavior engine 121 can be configured to learn behaviors, patterns, or files that are vulnerable. Accordingly, behavior engine 121 can conserve resources by only tracking files that are vulnerable. According to one aspect, behavior engine 121 tracks files based on configured policies. One policy may indicate, for example, that the files to be tracked include those files that are vulnerable such as system data files such as firmware files, settings and the like. The policies can include file paths and names, file extensions. In embodiments, a policy can include a plurality of behavior rules, for example, a separate rule for handling files and a separate rule for handling process patterns.

In an embodiment, behavior engine 121 adapts and improves its understanding of what constitutes suspicious or malicious behavior over time.

For example, behavior engine 121 uses one or more of the following to detect suspicious or malicious behavior. In an embodiment, behavior engine 121 observes various activities and operations within computing system 100. Behavior engine 121 analyzes patterns in file interactions, process executions, and other system behaviors. Embodiments of the system implement a feedback loop to receive information about confirmed malicious activities. This feedback allows behavior engine 121 adjust its algorithms and rules to more efficiently identify malware. In an embodiment, behavior engine 121 implements security policies. Exemplary policies are described below.

File tracking policies are configured to specify which files to track based on vulnerability. In an example, system data files (firmware files, settings) that are commonly targeted by malware can be tracked. Rule-based policies include a set of behavior rules for different aspects of system activity. In an example, separate rules are used for file handling and process pattern analysis. File path and name policies include specific file paths, names, or file extensions to identify vulnerable data. In an example, all files in a certain directory or files with specific extensions known to be vulnerable are tracked and utilized. Behavior rules for process policies can include rules for identifying suspicious process patterns. In an example, processes that attempt unusual or unauthorized activities, such as injecting code into other processes are monitored.

In an embodiment, dynamic policy adjustment is used. In this embodiment, policies are not static; they can be dynamically adjusted based on changes in the threat landscape. For example, periodic updates to policies based on new threat intelligence and system vulnerabilities can be used.

In an embodiment, policies set adaptive thresholds for suspicious behavior based on historical data. For example, the sensitivity of the system is adjusted based on changes in the threat level.

In an embodiment, user-defined policies are implemented by users or administrators to define custom policies. For example, organizations can tailor the system's behavior analysis to specific needs.

In response to an event being determined to be suspicious of malware by behavior engine 121, one or more VFHs can be started by virtual honeypot driver 136. More particularly, VFH properties can be generated, then VFHs can be created. For example, behavior engine 121 commands virtual honeypot driver 136 to initiate VFH creation. In a typical case, VFH creation begins with AI device 120 configuring VFH properties.

In an embodiment, behavior engine 121 in coordination with virtual honeypot driver 136 implements a "silent detect" mode. Specifically, behavior engine 121 detects suspicious activity, starts VFHs, but continues monitoring. Silent-detect mode enables additional suspicious activities to be detected while protecting against already-identified suspicious activity.

In an embodiment, behavior engine 121 is further configured to identify a potentially malicious actor, such as a process, associated with the suspicious operations. For example, the injector of an injected thread is identified as a potentially malicious actor. In an embodiment, the injector is a potentially malicious or suspect actor. This actor can also be a process. The suspect actor can be identified by analyzing the context of one or more callback operations. Further, in embodiments, an injected thread is identified by performing stack trace analysis, such as analysis on the execution stack.

A digital certificate is a cryptographic credential that serves to verify the identity of the entity that holds the digital certificate. In the context of computing systems, processes and threads often possess digital certificates, and these certificates are used for authentication and to establish trust.

In an embodiment, digital certificate comparison can include extraction of certificate information. The digital certificate associated with the potentially malicious actor is extracted. This certificate typically contains information such as the entity's identity, public key, and other relevant details.

Next, behavior engine 121 compares the certificate associated with the potentially malicious actor to certificates involved in potentially malicious activity. The behavior engine 121 maintains a list of known certificates involved in potentially malicious activity. These certificates are pre-identified as being associated with malicious actors or activities, such as a trusted certificate that was compromised earlier. During the certificate comparison, the extracted certificate is cross-referenced with this list.

The embodiment of FIG. 1 is described above with behavior engine 121 configured to collect information to be used for generation of VFHs. In an embodiment, behavior engine 121 collects behavior information and characteristics of a potentially malicious actor. In an embodiment, behavior information can include malicious operations information detected in earlier system operations, such as that by virtual honeypot driver 136 or behavior engine 121. In an embodiment, characteristics of the potentially malicious actor can include certificate information, a hash of an associated file, a binary file, a reputation local to the CS, or a network-based global reputation.

In an embodiment, virtual honeypot driver 136 is configured to monitor operations on CS 100. Virtual honeypot driver 136 is configured to communicate operations in the form of events to behavior engine 121. For example, virtual honeypot driver 136 creates events by monitoring operations, grouping various operations, applying a filter, and utilizing conditional operations.

In an embodiment, event creation comprises virtual honeypot driver 136 monitoring various operations on computing system 100 and translating the operations into events for behavior engine 121. Grouping, filtering, and conditional operations are methods used to organize, refine, and contextualize these operations, providing a focused dataset for subsequent analysis by behavior engine 121. For example, grouping is directed at categorizing operations into sets based on criteria to identify patterns. Filtering is directed at selecting or excluding operations based on predefined criteria to focus on relevant activities. Conditional operations are directed at applying rules to dynamically adapt criteria for event creation based on context or specific conditions.

In an embodiment, virtual honeypot driver 136 provides malicious actor process 114 or injected thread 116 (e.g. linked to malicious actor process 114) or process 118 created by malicious actor process 114 access to virtual file honeypots. For purposes of illustration, virtual file honeypot 134 and real file 132 are representative. Virtual file honeypot 134 is generated by virtual honeypot driver 136 with at least one parameter specific to the computer system 100, or injected thread 116, or process 114 or 118. In this way, a VFH can be tailored to a potentially malicious object.

No copy or version of virtual file honeypot 134 is stored on storage device 152. Thus, virtual honeypot driver 136 is able to serve virtual file honeypots to a process requesting access to storage device 152. Process requests lack direct access to storage device 152 and cannot tell the difference between real files and virtual file honeypots. However, virtual honeypot driver 136 can monitor activity on the virtual file honeypots to determine whether a given thread (or process, as operating with an injected thread) is acting on files in a way indicative of malware. For example, virtual honeypot driver 136 can monitor activity on the honeypots by injected thread 116, malicious actor process 114, or process 118 created by malicious actor process. In some embodiments, virtual honeypot driver 136 can monitor activity on the virtual file honeypots from any other object associated with the suspicious operations.

Real file 132 is also managed in kernel mode 130 by file system driver 142 and volume filter driver 144. Both drivers 142 and 144 manage real files 132, 148, and 150 on storage device 152. For purposes of illustration, only real files 132, 148, and 150 are shown in FIG. 1. In most implementations, the number of files will be much larger. File system driver 142 manages the entire storage device 152 and its filesystems. Volume filter driver 144 manages volumes within those filesystems. The volume filter driver 144 detects when changes by a file request are made on a block level of the storage and generates a backup file by copying original values of the changed sectors to free space within data storage according to a copy-on-write (COW) operation. In a copy-on-write operation, when the modification request is made, the original data may be copied into a new storage area, and then the original data block is modified.

Virtual honeypot driver 136 protects the files on storage device 152 by providing process 116 or process 118 deployed by malicious actor process 114 or malicious actor process 114 with at least one VFH file. In the embodiment shown in FIG. 1, virtual honeypot driver 136 has already been configured and has already identified CS 100 and actor 114 parameters. Process 116 has been identified and has been evaluated to preliminarily be indicative of malware (for example, by AI device 120). Virtual honeypot driver 136 accordingly provides virtual file honeypots to injected thread 116 or process 118 on-demand. The mix of real files and virtual file honeypots are represented in FIG. 1 by real file 132 and virtual file honeypot 134. The on-demand virtual file honeypots are generated by virtual honeypot driver 136 to have characteristics and properties such that they are indistinguishable from real system files to would-be malicious agents.

AI device 120 interacts with virtual honeypot driver 136 to iteratively generate virtual file honeypots. For example, in an embodiment AI device 120 uses a machine learning model trained to identify and predict details about files in CS 100. For example, patterns in file naming, structure, and content on storage device 152 can be used to train a machine learning model associated with AI device 120 so that AI device 120 can use the results to create plausible-sounding virtually file honeypots with file names, representative file structures, and file content that closely resembles real files on storage device 152.

Accordingly, AI device 120 is configured to generate VFH security properties for subsequent creation of VFHs. In an embodiment, AI device 120 configures VFH properties based on the predicted ransomware family and the collected behavior information and characteristics of the suspect actor.

In an embodiment, AI device 120 is integral to the generation of VFH properties. VFH properties are used for the creation and deployment of VFHs within computing system 100. AI device 120 leverages a diverse set of data sources to formulate properties, enhancing the system's ability to safeguard against ransomware attacks and other malicious activities. In embodiments, AI device 120 draws upon various sources to derive the VFH properties. These sources include data related to the computing system's type, name, version, operating system type, and operating system version.

Behavior information associated with the potentially malicious actor is another possible source. This information includes an actor certificate, one or more files associated with the actor, and a reputation, either local to CS 100 or a global reputation. In embodiments, behavior information includes information detected or otherwise sensed or observed in previous operations associated with potential malicious operations.

Another possible source can be characteristics of malicious actor 114. These characteristics comprise information about the malicious actor, such as hash values, binary file details, and certificates associated with their activities, which can be considered by the AI device 120. Such characteristics help in profiling potential threats and informing the VFH properties.

In the context of VFHs generation for threat detection and mitigation, malicious actor characteristics such as hash values, binary file details, and certificates are used to enable the system to protect itself against ransomware attacks and other forms of malware. These characteristics can be specifically utilized during VFHs generation.

For example, malicious actor's hash values, which can serve as identification of the potential malicious actor, are used as indicators. During VFHs generation, the history of the specific malicious actor's hash is obtained to identify the potential malicious intent and generate specific VFHs.

Hash whitelisting and blacklisting can also be used. Embodiments maintain a database of whitelisted and blacklisted hash values. Whitelisted hashes correspond to legitimate files and are used as references. Hashes that match the blacklist indicate potential threats. VFHs can be generated with the knowledge of these whitelisted and blacklisted hash values to improve the accuracy of threat detection.

In another example, malicious actor binary file details are used. Examples include binary fingerprinting such as the analysis of binary files' details includes studying their structure, code patterns, and functions. During VFH generation, the unique fingerprint of binary files are used in generating VFHs considering code patterns, and functions. Embodiments create VFHs with attributes designed to capture and respond to the specific expected behaviors by these binaries.

In another example, malicious actors' certificates are used for certificate verification. Malicious actors may attempt to use counterfeit or stolen certificates to appear legitimate. During VFHs generation, embodiments validate certificates associated with files and processes. Suspicious or unverified certificates prompt the creation of VFHs with specific properties. Trusted processes are allowed to execute but can be checked using VFHs.

In another example, certificate chain analysis is used. Analyzing an entire certificate chain can reveal anomalies. A certificate with an irregular or untrusted chain can indicate a malicious actor's involvement. VFHs can be configured to closely analyze files associated with such certificates.

By incorporating malicious actor characteristics into VFHs generation, embodiments ensure that VFHs are tailored to detect and respond to specific threats.

System 100 is configured so that behavior engine 121 has access to virtual honeypot driver 136 and the result of analysis can be conveyed to and used by virtual honeypot driver 136. In an alternative embodiment, the role of behavior engine 121 is supplemented in part by a threat-intelligence service.

In an embodiment, real-world data is used to retrain AI device 120. In an embodiment, AI device 120 can be retrained to generate VFHs based on properties based on newly collected data corresponding to confirmed malware injections.

Figure 2:
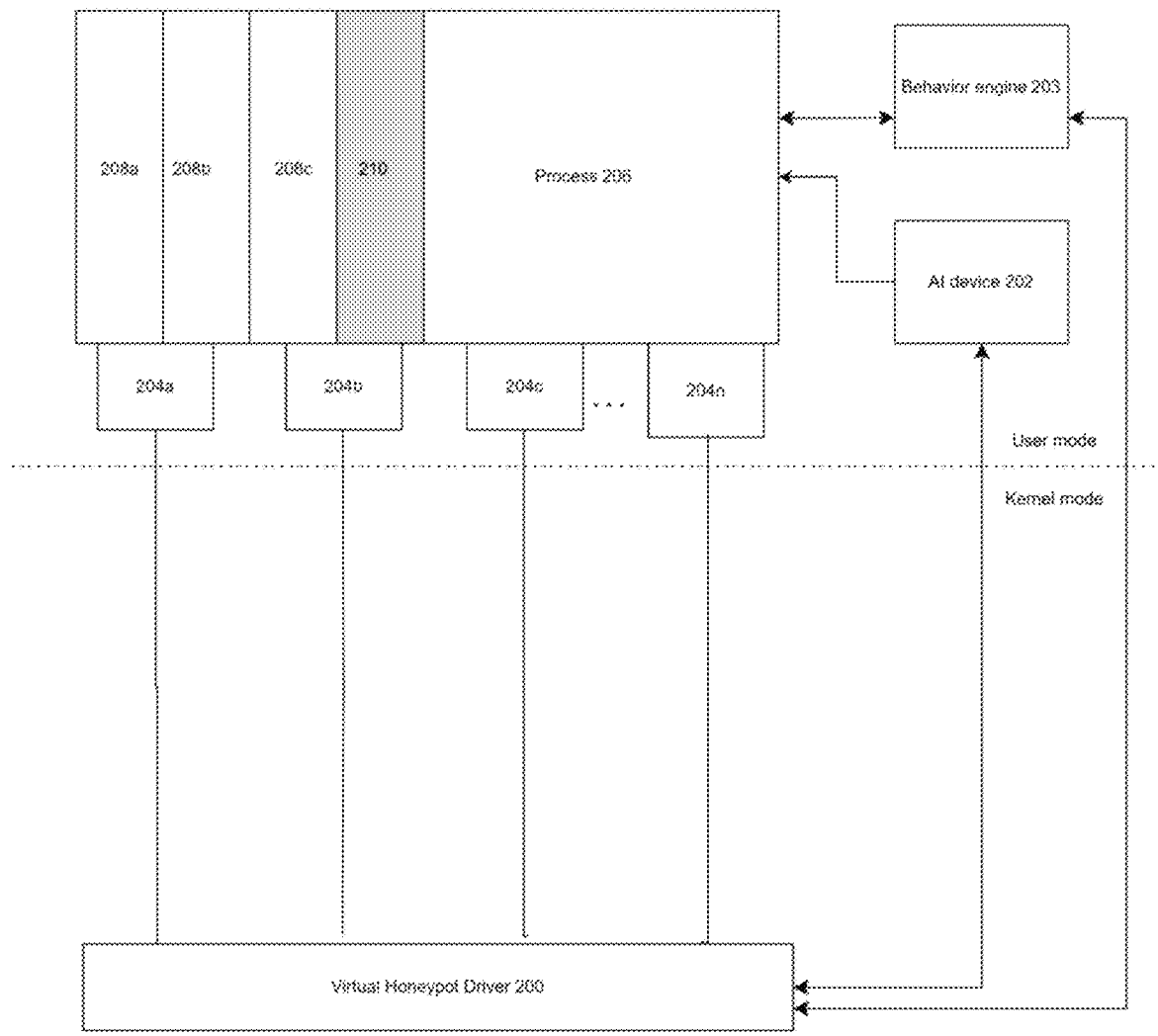
FIG. 2 is a flowchart of a method for generating VFHs, in accordance with an embodiment.

Referring to FIG. 2, a block diagram of a portion of an exemplary system for ransomware protection is depicted, according to an embodiment. Components of the system for ransomware protection of FIG. 2 are implemented in system 100 of FIG. 1 but are shown in FIG. 2 with renumbering for ease of illustration. For example, virtual honeypot driver 200 corresponds to virtual honeypot driver 136 in FIG. 1. Likewise, certain functions described with respect to FIG. 1 are incorporated in behavior engine 203, AI device 202, or control points 204*a-n*.

The ransomware-protection system includes virtual honeypot driver 200, behavior engine 203, AI device 202, and a plurality of control points 204*a-n*. Embodiments are configured to interact with process 206.

In an embodiment, behavior engine 203 is configured to identify a trusted process launched on a computing device.

In an embodiment, behavior engine 203 is configured to analyze the digital signature associated with trusted process 206.

In an embodiment, virtual honeypot driver 200 is configured to identify at least one thread injected into a trusted process. For example, threads based on a thread creation notification as identified by functions, such as PsSetCreateThreadNotifyRoutine. The PsSetCreateThreadNotifyRoutine is a routine that registers a driver-supplied callback that is notified when a new thread is created and when the thread is terminated. Accordingly, when a malicious actor injects a thread into trusted process 206, virtual honeypot driver 200 identifies the thread or process as one to monitor. PsSetCreateThreadNotifyRoutine also allows for logically linking the ProcessId of an injecting party to the injected process victim, thus giving the attacker's identity. In other embodiments, object manager callbacks can be utilized to identify a given process and further identify the process as trusted.

Behavior engine 203 is further configured to analyze events from virtual honeypot driver 200 and identify potentially malicious operations. Behavior engine 203 is further configured to identify a potentially malicious actor process, such as the injector in case of injections, based on event analysis. In an embodiment, a stack trace analysis is used to identify processes or injected threads.

In an embodiment, callbacks allow behavior engine 203 or virtual honeypot driver 200, or both to identify a process from which the injection is performed, for example, "CreateRemoteThread( )", IPC through user-mode hooking. Accordingly, behavior engine 203 is configured to identify a potentially malicious actor process and associated characteristics by analyzing the context of at least one of the callback operations.

In an embodiment, Behavior engine 203 is configured to detect and analyze data related to DLL Load Callbacks; for example, analyzing dynamic link library (DLL) load events and the associated processes to identify unexpected or suspicious DLL injections.

In another example, data related to Process Creation Callbacks can be detected and analyzed, including monitoring and analyzing the creation of new processes, focusing on parent-child process relationships and identifying unusual or unauthorized processes.

In another example, data related to Thread Creation Callbacks can be detected and analyzed, including observing the creation of threads within processes, especially when such threads involve remote thread creation, which may indicate a potential injection.

In another example, data related to Registry Modification Callbacks can be detected and analyzed, including tracking changes to the Windows Registry, as certain registry keys and values can be manipulated by malware to persist or hide its presence.

In another example, data related to File System Operation Callbacks can be detected and analyzed, including examining file-related operations, such as file creation, modification, or deletion, which can reveal suspicious activity like the creation of malicious files.

In another example, data related to Network Callbacks can be detected and analyzed, including monitoring network-related events and communications to identify any unexpected or unauthorized network traffic initiated by processes.

In another example, data related to Kernel Object Callbacks can be detected and analyzed, including analyzing changes to kernel objects, such as device objects, driver objects, and symbolic links, which can be manipulated by malware.

In another example, data related to Memory Modification Callbacks can be detected and analyzed, including detecting changes to memory regions within processes, which can uncover in-memory injection or manipulation by malicious code.

In another example, data related to interception of API Calls can be detected and analyzed, including intercepting and analyzing Application Programming Interface (API) calls made by processes to identify unusual or unauthorized API usage.

In another example, data related to Interprocess Communication (IPC) Callbacks can be detected and analyzed, including monitoring IPC mechanisms, including named pipes, sockets, and interprocess communication events, to detect suspicious communication between processes.

In another example, data related to User Mode Hooking can be detected and analyzed, including identifying instances where user-mode hooking or hooking of user-level functions is used to manipulate the behavior of processes, potentially indicating malicious intent.

In another example, data related to System Service Table (SSDT) Hooking can be detected and analyzed, including detecting unauthorized modifications to the System Service Table, which can be an indication of rootkit activity.

In another example, data related to ObRegisterCallbacks can be detected and analyzed, including the registration of callback functions for monitoring operations performed on Windows objects by various drivers and components. By analyzing ObRegisterCallbacks, the embodiments can detect and characterize potential malware injections, especially when such registrations are associated with suspicious or unauthorized activities. Monitoring these callback registrations can provide insights into attempts to manipulate the behavior of drivers and system objects, which may indicate the presence of malicious code.

In an embodiment, virtual honeypot driver 200 is configured to detect when processes 206 have been launched on system 100. Whenever any new processes have been started in the system, virtual honeypot driver 200 can be configured to constantly monitor all threads 208a-c, 210 in those new processes. In one implementation, virtual honeypot driver 200 is configured to identify one or more trusted processes. In some implementations, virtual honeypot driver 200 is configured to perform call stack trace or execution stack trace monitoring on one or more control points 204a-n of a thread associated with the one or more trusted processes. According to the embodiment, a particular control point 204a-n is selected as an element to analyze at the point of execution of certain file operations and other operations that virtual honeypot driver 200 intercepts, thereby covering all sources of malicious threads, regardless of their origin, under the approach that the target of the operation matters rather than the source of the malicious thread. In other words, by intercepting at the target rather than at the source(s), all sources of malicious operations can be captured. More particularly, stack trace operations can identify all processes of potentially malicious actor processes or injected threads. Accordingly, virtual honeypot driver 200, using control points 204a-n identify the process or injected thread in the trusted process created by the potentially malicious actor on the CS.

A plurality of control points 204a-n, on which call stack trace or execution stack trace monitoring is performed, are associated with the events or activities of trusted process 206, including file creation, file cleanup, file close, handle deprecation, file renaming, file deletion, thread creation, writing to virtual memory, and other file-related or memory-related events. In some implementations, control points 204a-n correspond to system calls exposed by the operating system for performing the above-described events or activities, such as "CreateFile( )", "DeleteFile( )", "CreateThread( )", "CreateRemoteThread( )", and "Write VirtualMemory( )". In other example events or activities, control points 204a-n are associated with cleaning up a file, closing a file, duplicating a handle, renaming a file, a registry operation, a Component Object Model (COM) operation, a Remote Procedure Call (RPC) call, or a Local Procedure Call (LPC) call. In an aspect, at least one of control points 204a-n is associated with a system call (e.g., "CreateRemoteThread( )") to create a remote thread that runs in a virtual address space of another process, such as trusted process 206.

Process 206 is depicted in FIG. 2 with a plurality of threads, including benign threads 208a-208c and injected thread 210.

Accordingly, at least one of the plurality of control points 204a-n are configured to monitor injected thread 210 of trusted process 206. At least one of the plurality of control points 204a-n is further configured to detect activity of injected thread 210 at a particular control point.

In embodiments, control points 204a-n can further monitor threads 208a-208c. In an embodiment, at least one plurality of control points 204a-n can ignore non-injected processes.

Behavior engine 203 is further configured to mitigate risk to the computer system of the injected thread. For example, behavior engine 203 can generate an alert to a user and provide the user with detection results including an indication of the injected thread as a malware injection. In another example, behavior engine 203 can suspend the injected thread. In another example, behavior engine 203 can terminate the injected thread. Though not depicted in FIG. 2, as needed, behavior engine 203 can integrate with or utilize user mode resources to operate on the injected thread such as to suspend or terminate the thread, if unable to do so in kernel space. In an embodiment, virtual honeypot driver 200 operates in kernel space on the injected thread such as to suspend or terminate the thread, such as in coordination with AI device 202. In another example, behavior engine 203 can perform CS recovery based on an existing snapshot. Because VFHs are virtual, CS recovering or snapshotting does not include any VFHs.

Figure 3:
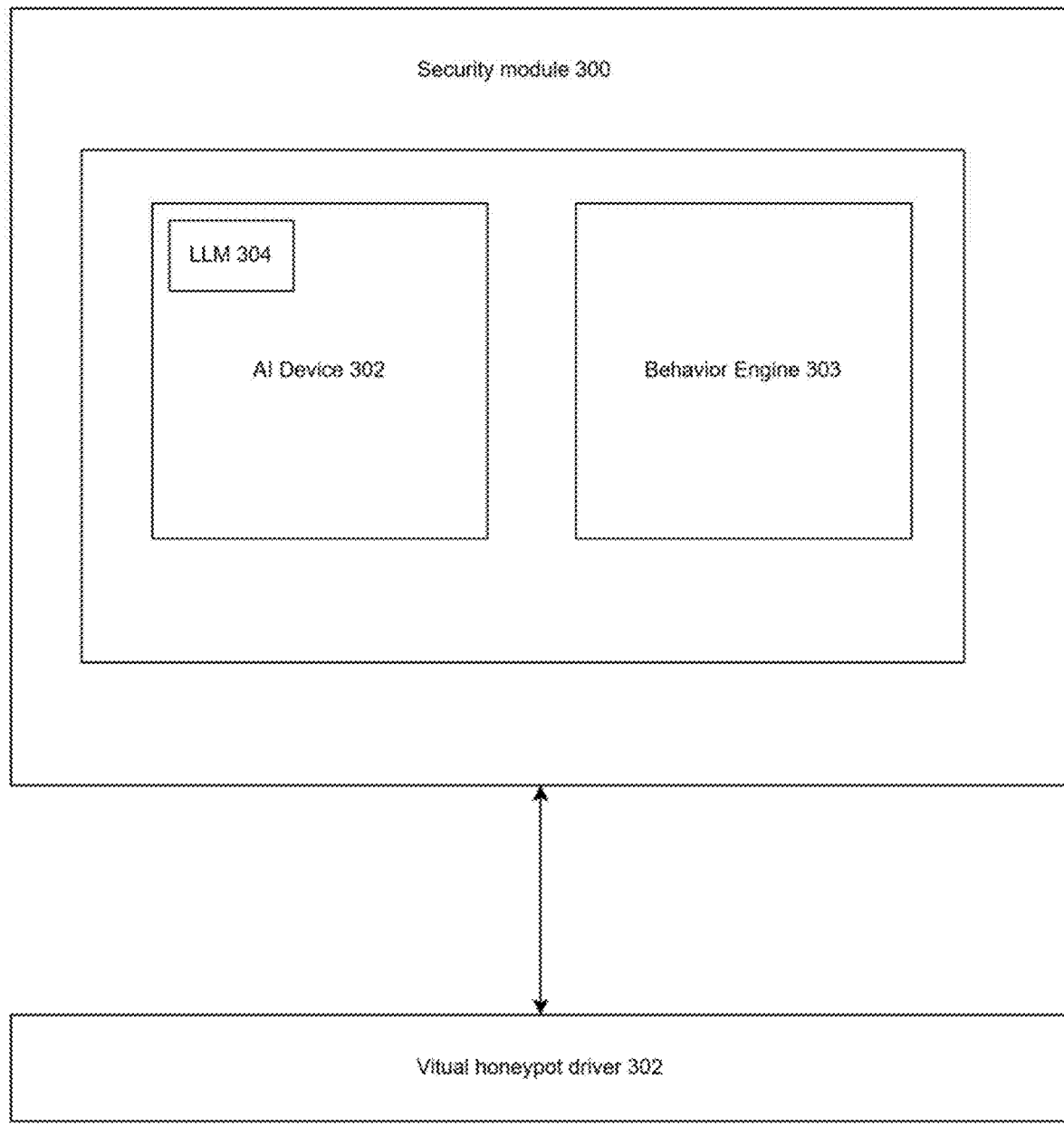
FIG. 3 is a block diagram of a portion of a system for ransomware protection, according to an embodiment.

Referring to FIG. 3, a block diagram of a portion of a system for ransomware protection is depicted, according to an embodiment. FIG. 3 depicts a security module 300 communicatively coupled to virtual honeypot driver 302. In embodiments, virtual honeypot driver 302 is substantially similar to virtual honeypot drivers 136 or 200 shown in FIGS. 1-2.

Security module 300 generally comprises AI device 302, behavior engine 303, and LLM 304.

In an embodiment, security module 300 can be implemented in system 100 of FIG. 1, as well as the portion depicted in FIG. 2. For example, as illustrated, security module 300 can be implemented with the various functions of the respective behavior engines and AI devices. For example, behavior engine 303 can be substantially similar to behavior engine 121 or 203. AI device 302 and LLM 304 can be substantially similar to AI device 120 or 202. In a particular embodiment, security module 300 has additional functionality, including integration with the existing security infrastructure of the computing system. While not depicted in detail, security module 300 is designed to interact with other components of the security system, enhancing its capability to defend against a wide range of cyber threats. For example, upon detection of a ransomware attack or other security threats, security module 300 can initiate and coordinate response actions. This includes isolating affected systems, alerting security personnel, and triggering automated containment and mitigation processes. The module serves as a central hub for orchestrating a unified response to incidents, reducing the time to remediation. As another example, security module 300 plays enforces security policies across the computing system. It can dynamically adjust security controls based on the current threat level, ensuring that the system's defenses are always appropriately calibrated. This includes managing access controls, updating firewall rules, and deploying additional VFHs as needed.

Figure 4:
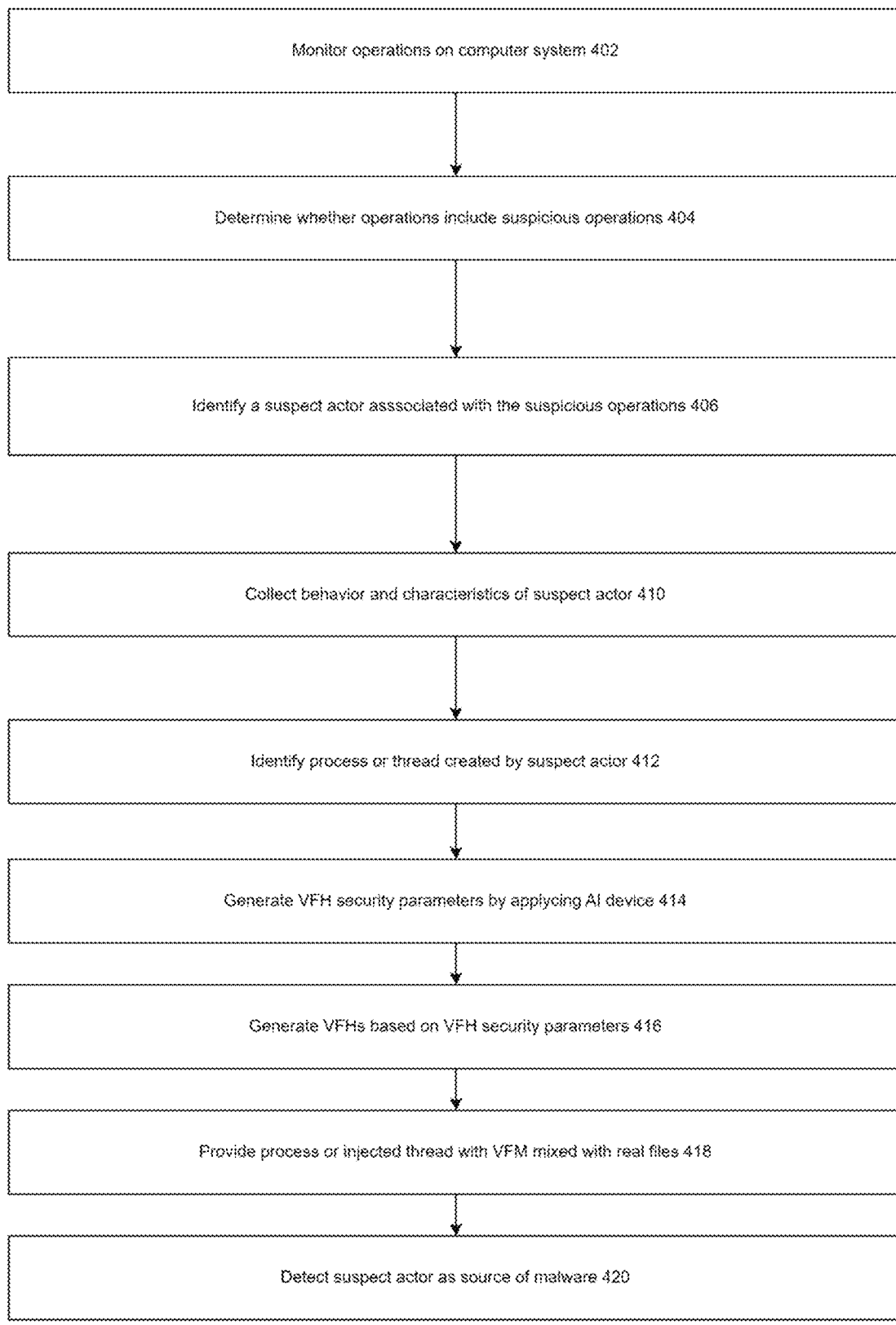
FIG. 4 is a flowchart of a method for ransomware protection in injection-based attacks, according to an embodiment.

Referring to FIG. 4, a flowchart of method 400 for ransomware protection in injection-based attacks is depicted, according to an embodiment. In an embodiment, method 400 can be implemented by the systems depicted in FIG. 1, FIG. 2, or FIG. 3.

At 402, one or more operations on the computer system are monitored. For example, in the context of FIG. 2, virtual honeypot driver 200 monitors operations of process 206, such as operations from threads 208a-c and 210. Virtual honeypot driver 200 then packages operations in the form of events and communicate events to behavior engine 121.

At 404, a determination is made as to whether the one or more monitored operations includes a suspicious operation. For example, in FIG. 1, behavior engine 121 uses behavioral analysis to identify suspicious injections or suspicious processes. In FIG. 2, after receiving one r more events from virtual honeypot driver 200, behavior engine 203 analyzes the received events, and determines whether one or more operations associated with an event are suspicious as malware. Behavior engine 203 implements a behavior-based approach to identify malware without specific malware signatures. In an embodiment, one or more policies can be used to identify suspicious operations.

At 406, a potentially malicious actor associated with the suspicious operation is identified. For example, behavior engine 121 or 203 in FIG. 1 and FIG. 2 respectively identify malicious actor 114.

At 410, behavior and characteristics of the potentially malicious actor are collected. For example, behavior engine 203 collects information to be used for generation of VFHs. More particularly, behavior engine 203 collects behavior information and characteristics of the potentially malicious actor for targeted generation and deployment of VFHs towards the potentially malicious actor.

At 412, a process or injected thread created by the potentially malicious actor is identified. For example, a specific process or injected thread can be identified to be targeted by virtual honeypot driver 200 in coordination with respective control points 204a-n. In an embodiment, a stack trace analysis is used to identify processes or injected threads to feed the identified processes with VFHs.

At 414, VFH properties are generated. For example, AI device 120 in FIG. 1 can be applied to at least one of CS environment information, behavior information of the potentially malicious actor, the characteristics of the potentially malicious actor, or auxiliary information.

At 416, at least one VFH is generated based on the VFH properties. For example, AI device 202 in FIG. 2, generates one or more VFHs specific to injected thread 210 (or process, in the case of process 118 in FIG. 1). In embodiments, AI device 202 generates a VFH based on the VFH properties.

At 418, the injected thread is provided with the VFH generated at 416. For example, virtual file honeypot 134 in FIG. 1 is provided to the injected thread. These can include injected thread 210 of FIG. 2 or an injected thread in process 116 or process 118 in FIG. 1. In an embodiment at 418, the VFH is provided as part of a mix with real files.

At 420, the potentially malicious actor is determined to be a source of malware based on the interaction with the VFH presented at 418. For example, virtual honeypot driver 200 in FIG. 2 monitors injected thread 210 interaction with one or more VFHs presented. The interaction is communicated to behavior engine 203. In an embodiment, behavior engine 203 can utilize a heuristic analysis to determine whether the associated actor is malware.

Figure 5:
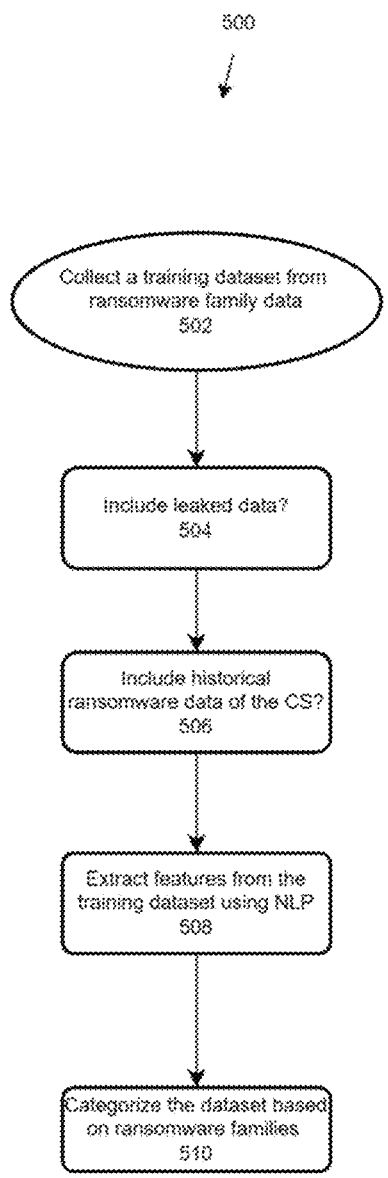
FIG. 5 is a flowchart of a method for pretraining an LLM of an AI device, according to an embodiment.

Referring to FIG. 5, an exemplary method 500 for pretraining the LLM of the AI device is depicted, according to an embodiment. At 502, a training dataset is collected from ransomware family data. Optionally, leaked data from known ransomware families can be included in the dataset at 504. Another option at 506 is inclusion of historical ransomware data from the computing system (CS) being protected by the AI device. Pretraining the LLM to generate VFHs further can include performing testing scenarios such as generating a test VFH using the generative machine-learning device for a test case. The test case corresponds to known ransomware, a corresponding known ransomware family, test behavior information, and test characteristics of a test suspect actor. The known ransomware is then executed in an isolated environment. A process of the known ransomware is provided with the test VFHs and the known ransomware is detected by performing a heuristic analysis. A feedback loop is generated for the VFHs for retraining the generative machine-learning device. The generative machine-learning device can be retrained based on the known ransomware family, the test behavior information, the test characteristics of the test suspect actor, and the feedback loop.

Feature extraction takes place at 508 using NLP techniques as described above. The training dataset is then categorized at 510 based on ransomware families.

Figure 6:
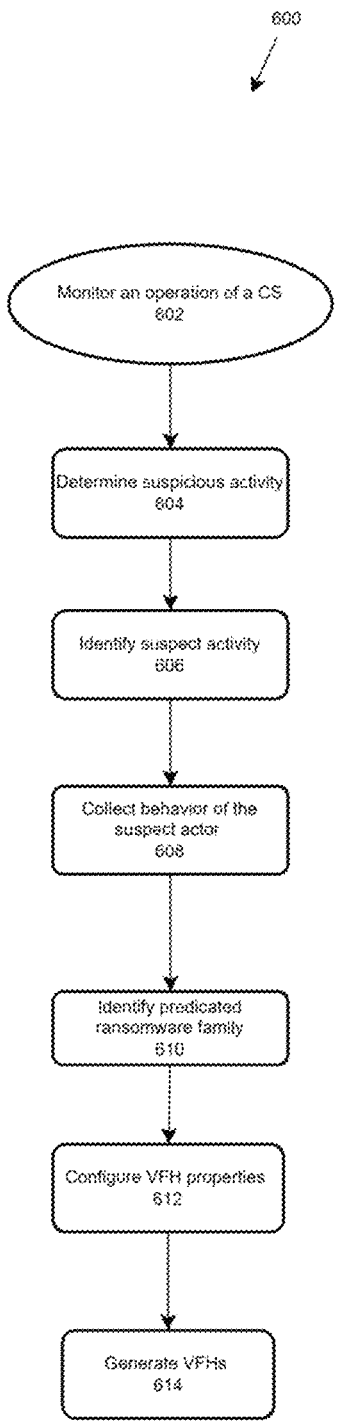
FIG. 6 is a flowchart of a method for monitoring a computing system, according to an embodiment.

Referring to FIG. 6, an exemplary method 600 for monitoring operations of a computing system is depicted that implements the techniques described above, according to an embodiment. At 602, computing system operations are monitored, for example, by behavior engine 121, 203, and 303 from FIGS. 1, 2, and 3. At 604, a determination is made by the behavior engine that suspicious activity is taking place in the computing system. A suspect actor or activity is identified at 606. Behavior data about the suspect actor is collected at 608. A predicted ransomware family is generated by the behavior engine at 610. Identifying the predicted ransomware family comprises matching suspect actor operations using the behavior engine applied to operations of the known ransomware families. Static features of program code associated with the suspect actor operations are analyzed or Windows Portable Executables (PE) are analyzed using a PE-machine learning model trained based on known ransomware to determine a ransomware family. As another example, detection or YARA rules can be used for matching purposes.

A VFH is configured by the AI device at 612 based on attributes of the ransomware family. The VFH is then generated at 614 by the AI device and appears to the suspect actor like a real file of the computer system being protected.

In some embodiments, the CS system environment is an Industrial Control System (ICS). More particularly, an ICS is an electronic control system and associated instrumentation used for industrial process control. Control systems can range in size from a few modular panel-mounted controllers to large interconnected and interactive distributed control systems (DCSs) with many thousands of field connections. Control systems receive data from remote sensors measuring process variables (PVs), compare the collected data with desired setpoints (SPs), and derive command functions that are used to control a process through the final control elements (FCEs), such as control valves. Larger systems are often implemented by supervisory control and data acquisition (SCADA) systems, or DCSs, and programmable logic controllers (PLCs). SCADA and PLC systems are also scalable down to smaller systems with few control loops. When VFH creation takes place in an ICS, the VFH-creation process considers the unique characteristics of ICS, such as specialized file types, directory structures, and communication protocols commonly found in industrial settings. In embodiments, VFH creation also considers malicious actor characteristics specific to the ICS, such as ICS control events, as well as hashes, binary files, and certificates, etc. specific to the ICS actor.

In some embodiments, the CS is an Internet of Things (IoT) system. IoT generally refers to sensors, processing ability, software, and technologies that connect and exchange data with other devices and systems over the Internet or other communications networks. IoT includes electronics, communication and computer science engineering, using technology that connects the digital and physical worlds. For example, an object is fitted with sensors that monitor temperature or motion. The object can also include actuators, which receive signals from the sensors and then take action in response to those signals. As generally implemented, IoT technologies and products present an attractive attack surface for malicious actors. IoT systems also generate large amounts of data but need quick access to this data without affecting system performance. At the same time, IoT systems usually avoid traditional data storage models, where large amounts of data are stored in one place. For an IoT system, the VFH-creation process considers the distinctive features of IoT devices and networks, which can include different file types, naming conventions, and communication patterns compared to ICS. In embodiments, for an IoT system, VFH creation also considers malicious actor characteristics specific to the IoT, such as Internet network-based actors, as well as hashes, binary files, and certificates, etc. specific to the IoT actor.

The VFH-creation process works similarly for other CS environments by incorporating distinctive features of at least one of the environments, malicious actor characteristics specific to the particular environment (as actors can be communicatively coupled to a first CS environment different than a second CS environment), as well as hashes, binary files, and certificates, etc. specific to the actor and auxiliary information into the VFHs. For example, the CS environment may be a Building Automation Systems (BAS). BAS often have limited storage resources. Virtual file honeypots are a particularly effective security solution for BAS to minimize the storage footprint while maintaining protection against ransomware threats. BAS, also known as building management systems (BMS) or building energy management systems (BEMS), are typically used to control a building's heating, ventilation and air conditioning (HVAC), electrical, lighting, shading, access control, security systems, and related systems. These systems combine the control of various building automation functions with common control interfaces. For example, a smart building system connects sensors and devices to work in coordination to share data for managed building ecosystems in real time. Leveraging building data and applying artificial intelligence and machine learning (AI/ML) to the data makes the building both programmable and responsive to the needs of the users and the building manager. More particularly, the VFH can be created for low or limited resource components unique to a BAS.

Healthcare Control Systems (HCS) are another example of systems with distinctive features that can be incorporated into VFHs. These systems are traditionally used in healthcare settings, often with limited storage capabilities, which provide software and mobile applications combining real-time, workflow control technologies with best practices used in manufacturing and transportation. HCSs can improve collaboration, patient outcomes, surgeon outreach, utilization, revenue, and profit. Some healthcare organizations have various types of specialized hospital information systems such as electronic health records (EHR) systems, e-prescribing systems, practice management support systems, clinical decision support systems, radiology information systems and computerized physician order entry (CPOE) systems. Virtual file honeypots enhance the security of these systems without significant storage overhead. In embodiments, for an HCS system, VFH creation considers the specific HCS environment, behavior information of a potentially malicious actor, such as an actor with control of a CPOE operating on EHRs, or other HCS actor characteristics.

Yet another system type with distinctive features that can be incorporated into VFHs is that of telecommunications infrastructures. Telecommunication infrastructures are known to have limited storage capacity, especially in remote or rural areas. At the same time, telecommunications infrastructures comprise the physical medium through which internet traffic flows, including telephone wires, above and below-ground cables, submarine cables, satellites, microwaves, and mobile technology including latest generation mobile networks such as 5G. Network infrastructure refers to the hardware and software that allow for network connectivity and communication between users, devices, applications, and the internet. Telecommunications infrastructure services provide setup, maintenance, and consulting for data and voice communications technologies. Examples of telecommunications infrastructure services include optical fiber installation, cell tower site location, radio antenna testing, installation of standard phone equipment and data networks. These systems present attractive attack surfaces for malicious actors. Virtual file honeypots serve as a viable security measure for these systems because of reduced storage requirements. In embodiments, for a telecommunications system, VFH creation considers malicious actor characteristics specific to the telecommunications infrastructure, such as a telecommunication-networked actor, as well as other telecommunications infrastructure actor characteristics.

Transportation control systems provide another example of a distinctive system for the creation of VFHs. Such systems generally have limited storage resources due to their specialized nature. Transportation control systems are used to manage and optimize flow of traffic on roads, highways, and similar transportation networks. Transportation control systems use sensors, cameras, and communication networks to collect real-time data on traffic conditions and vehicle movements. This data is analyzed and used to control traffic signals, variable message signs, and other traffic management devices. Transportation control systems can also be used to manage public transportation networks, such as buses and trains. These systems can provide real-time information on vehicle locations and arrival times, allowing passengers to plan their journeys more effectively. Transportation control can also be used to optimize routes and schedules, improving the efficiency of public transportation networks. Virtual file honeypots offer an efficient way to protect these systems without increasing the storage footprint. In embodiments, for a transportation control system, VFH creation considers the specific transportation control system environment, malicious actor characteristics specific to the transportation environment, such as a low-resource actor, as well as other transportation actor characteristics.

In embodiments, VFHs can be created for enterprise security systems. Enterprise security is a multi-faceted concern that includes both the internal or proprietary business secrets of a company as well as the employee and customer data related to privacy laws. Enterprise security is focused on data center, networking, and web server operations, including for social engineering risks. In embodiments for a transportation control system, VFH creation considers the specific enterprise environment, malicious actor characteristics specific to the transportation environment, such actors with access to enterprise security, as well as other enterprise actor characteristics.

In embodiments, VFHs can likewise be created for consumer security systems and similarly consider the specific consumer environment, malicious actor characteristics specific to consumer security, such as a consumer-user facing actors, as well as other consumer security system actor characteristics.

The invention claimed is:

1. A method for automatic generation of virtual file honeypots (VFHs) for protecting a target computing system (CS) against ransomware attacks using an artificial intelligence (AI) device, the method comprising:
    pretraining a generative machine-learning device comprising a large language model (LLM) to generate VFHs for specific ransomware families and characteristic activities, wherein the pretraining comprises:
        collecting a pretraining training dataset from threat-intelligence sources of ransomware data, wherein ransomware data comprises data specific to a ransomware family,
        extracting features from the training dataset using natural language processing (NLP), and
        categorizing the pretraining dataset based on ransomware families;
    monitoring an operation of the CS;
    determining whether the operation comprises suspicious activity according to a policy;
    identifying a suspect actor associated with the suspicious activity;
    collecting behavior information and characteristics of the suspect actor;
    identifying a predicted ransomware family based on the operation comprising suspicious activity;
    configuring VFH properties based on the predicted ransomware family and the collected behavior information and characteristics of the suspect actor; and
    generating a plurality of VFHs according to the configured VFH properties using the generative machine-learning device.

2. The method of claim 1, wherein identifying a predicted ransomware family is further based on the identified suspect actor.

3. The method of claim 1, wherein the pretraining dataset further comprises leaked data associated with known ransomware attacks.

4. The method of claim 1, wherein the pretraining dataset further comprises historical ransomware data of the CS.

5. The method of claim 1, wherein the characteristics include a certificate, a hash of a file, a binary file, or a reputation.

6. The method of claim 1, further comprising:
identifying a process, or an injected thread in a trusted process, created by the suspect actor on the CS;
providing the process, or the injected thread in a trusted process, with the plurality of generated VFHs; and
detecting the suspect actor as a source of malware by performing a heuristic analysis.

7. The method of claim 1, further comprising implementing a partial update of the pretraining dataset with:
updated ransomware data collected from threat-intelligence sources;
data collected by crawlers; and
data from the target CS.

8. The method of claim 1, wherein pretraining the LLM to generate VFHs further comprises performing testing scenarios, including:
generating a test VFH using the generative machine-learning device for a test case, corresponding to a known ransomware and corresponding known ransomware family, test behavior information and test characteristics of a test suspect actor;
executing the known ransomware in an isolated environment;
providing a process of the known ransomware with the test VFHs;
detecting the known ransomware by performing a heuristic analysis;
generating a feedback loop about the VFHs for retraining the generative machine-learning device; and
retraining the generative machine-learning device based on the known ransomware family, the test behavior information, the test characteristics of the test suspect actor, and the feedback loop.

9. The method of claim 1, further comprising dynamically updating the predicted ransomware family for the suspect actor identification based on an analysis of current CS operations and the behavior of the potentially malicious actor.

10. The method of claim 1, further comprising generating a feedback loop for a generated VFH, wherein the feedback loop comprises confirmed malware detections, a predicted ransomware family, behavior information, and characteristics of the potentially malicious actor for retraining of the generative machine-learning module.

11. The method of claim 1, wherein identifying the predicted ransomware family comprises:
matching suspect actor operations using the generative machine learning device applied to operations of the known ransomware families;
analyzing static features of program code associated with the suspect actor operations; or
analyzing Windows Portable Executables (PE) using a PE-machine learning model trained based on known ransomware to determine a ransomware family.

12. The method of claim 1, further comprising validating the generated VFHs against predefined criteria associated with a specific ransomware family, wherein the predefined criteria include file format, file size, file content, or file structure.

13. The method of claim 1, further comprising initiating a security action based on a detected malware, wherein the security action generates an alert to a user of the CS and provides the user of the CS with detection results, wherein the detection results comprise:
an indication of the potentially malicious actor as malware injection;
suspending the injected thread created by the malware injection;
terminating the injected thread created by the malware injection; or
performing CS recovery based on an existing snapshot, wherein the CS recovery does not include any of the plurality of generated VFHs.

14. A system for automatic generation of virtual file honeypots (VFHs) for protecting a target computing system (CS) comprising user space and kernel space against ransomware attacks using an artificial intelligence (AI) device, the system comprising:
a pretrained generative AI device coupled to a processor and a storage medium comprising a large language model (LLM) to generate VFHs for specific ransomware families and characteristic activities, wherein the pretrained generative AI device is pretrained by:
collecting a pretraining training dataset from threat-intelligence sources of ransomware data, wherein ransomware data comprises data specific to a ransomware family,
extracting features from the training dataset using natural language processing (NLP), and
categorizing the pretraining dataset based on ransomware families;
a virtual honeypot driver, operating in kernel space and in communication with the AI device, configured for:
monitoring an operation of the CS and determining whether the operation comprises suspicious activity according to a policy,
identifying a suspect actor associated with the suspicious activity,
collecting behavior information and characteristics of the suspect actor,
identifying a predicted ransomware family based on the operation comprising suspicious activity,
configuring, by the AI device, VFH properties based on the predicted ransomware family and the collected behavior information and characteristics of the suspect actor, and
Generating, by the AI device, a plurality of VFHs according to the configured VFH properties using the generative machine-learning device;
a filesystem comprising a plurality of files in user space; and
a plurality of VFHs created by the virtual honeypot driver and configured to mimic targets of the predicted ransomware family.

15. The system of claim 14, wherein identifying a predicted ransomware family is further based on the identified suspect actor.

16. The system of claim 14, wherein the pretraining dataset further comprises leaked data associated with known ransomware attacks.

17. The system of claim 14, wherein the pretraining dataset further comprises historical ransomware data of the CS.

18. The system of claim 14, wherein the characteristics include a certificate, a hash of a file, a binary file, or a reputation.

19. A non-transitory computer-readable storage medium with instructions for automatic generation of virtual file honeypots (VFHs) for protecting a target computing system (CS) against ransomware attacks using an artificial intelligence (AI) device, the instructions comprising:
- pretraining a generative machine-learning device comprising a large language model (LLM) to generate VFHs for specific ransomware families and characteristic activities, wherein the pretraining comprises:
  - collecting a training dataset from threat-intelligence sources of ransomware data, wherein ransomware data comprises data specific to a ransomware family,
  - extracting features from the training dataset using natural language processing (NLP), and
  - categorizing the pretraining dataset based on ransomware families;
- monitoring an operation of the CS;
- determining whether the operation comprises suspicious activity according to a policy;
- identifying a suspect actor associated with the suspicious activity;
- collecting behavior information and characteristics of the suspect actor;
- identifying a predicted ransomware family based on the operation comprising suspicious activity;
- configuring VFH properties based on the predicted ransomware family and the collected behavior information and characteristics of the suspect actor; and
- generating a plurality of VFHs according to the configured VFH properties using the generative machine-learning device.

20. The non-transitory computer-readable storage medium of claim 19, wherein identifying the predicted ransomware family is further based on the identified suspect actor.

* * * * *